United States Patent
Herrold

(10) Patent No.: US 9,566,658 B1
(45) Date of Patent: Feb. 14, 2017

(54) SHIELDING GAS MECHANISMS FOR ARC WELDING SYSTEMS

(71) Applicant: Frank E. Herrold, Portland, OR (US)

(72) Inventor: Frank E. Herrold, Portland, OR (US)

( * ) Notice: Subject to any disclaimer, the term of this patent is extended or adjusted under 35 U.S.C. 154(b) by 0 days.

(21) Appl. No.: 14/836,078

(22) Filed: Aug. 26, 2015

(51) Int. Cl.
| | |
|---|---|
| *B23K 9/095* | (2006.01) |
| *B23K 9/173* | (2006.01) |
| *B23K 9/10* | (2006.01) |
| *B23K 9/133* | (2006.01) |

(52) U.S. Cl.
CPC .............. *B23K 9/173* (2013.01); *B23K 9/095* (2013.01); *B23K 9/10* (2013.01); *B23K 9/1006* (2013.01); *B23K 9/133* (2013.01)

(58) Field of Classification Search
CPC ......... B23K 9/095; B23K 9/10; B23K 9/1006; B23K 9/16; B23K 9/164; B23K 9/133; B23K 9/173
USPC .......................... 219/54, 74, 75, 130.1, 132
See application file for complete search history.

(56) References Cited

U.S. PATENT DOCUMENTS

| | | | | |
|---|---|---|---|---|
| 2011/0284500 A1* | 11/2011 | Rappl | .................. | B23K 9/1006 219/74 |
| 2013/0112660 A1* | 5/2013 | Enyedy | ................ | B23K 9/0956 219/74 |

* cited by examiner

*Primary Examiner* — Brian Jennison
(74) *Attorney, Agent, or Firm* — Mohr Intellectual Property Law Solutions, PC

(57) ABSTRACT

Shielding gas mechanisms for arc welding systems are shown and described. The shielding gas mechanisms each include a gas sensor configured to read and provide a measurement of the shielding gas and a shut-off mechanism configured to stop power to a welding gun when the measurement of the shielding gas falls below a minimum effective level. In some examples, the gas sensor is coupled to the gas line proximal to an inlet of a wire feed unit. In some other examples, the gas sensor is coupled to the gas line proximal to an outlet of the wire feed unit. In even other examples, the gas sensor is coupled to the welding gun.

20 Claims, 3 Drawing Sheets

SHIELDING GAS MECHANISMS FOR ARC WELDING SYSTEMS

BACKGROUND

The present disclosure relates generally to shielding gas mechanisms for arc welding systems. In particular, arc welding systems including gas pressure sensing and automatic shut-off mechanisms are described.

Arc welding is a type of welding that uses a welding power supply to create an electric arc between an electrode and a base material to melt metal at a desired welding point of a work piece. Arc welding systems generally use a shielding gas mechanism to provide a shielding gas (i.e., inert or semi-inert gas) in order to protect the welding region of a work piece during a welding operation. Specifically, the shielding gas protects the welding point from oxygen and water vapor. Thus, insufficient shielding gas can lead to porous welds, weak welds, and/or cause splatter, which can increase the working time by requiring additional clean up.

Known shielding gas mechanisms are not entirely satisfactory for the range of applications in which they are employed. For example, existing shielding gas mechanisms include hoses that may undergo kinking and/or damage, thereby stopping or slowing the flow of gas. Further, hose fittings may degrade with use or loosen causing gas leaks. In addition, in conventional shielding gas mechanisms, the gas supply can run low or run out without alerting the user that the gas flow is stopped or insufficient to provide effective shielding.

Thus, there exists a need for shielding gas mechanisms that improve upon and advance the design of known shielding gas mechanisms. Examples of new and useful shielding gas mechanisms relevant to the needs existing in the field are discussed below.

SUMMARY

The present disclosure is directed to shielding gas mechanisms for arc welding systems, the gas metal arc welding systems each having a welding gun, a wire feed unit coupled to the welding gun, an electrode source coupled to the wire feed unit to provide a wire electrode to the welding gun, a power supply configured to provide power to the welding gun, and a shielding gas supply configured to provide gas flow to the welding gun via a gas line. The shielding gas mechanisms each include a gas sensor configured to read and provide a measurement of the shielding gas and a shut-off mechanism configured to stop power to the welding gun when the measurement of the shielding gas falls below a minimum effective level. In some examples, the gas sensor is coupled to the gas line proximal to an inlet of the wire feed unit. In some other examples, the gas sensor is coupled to the gas line proximal to an outlet of the wire feed unit. In even other examples, the gas sensor is coupled to the welding gun.

DETAILED DESCRIPTION

The disclosed shielding gas mechanisms will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various shielding gas mechanisms are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
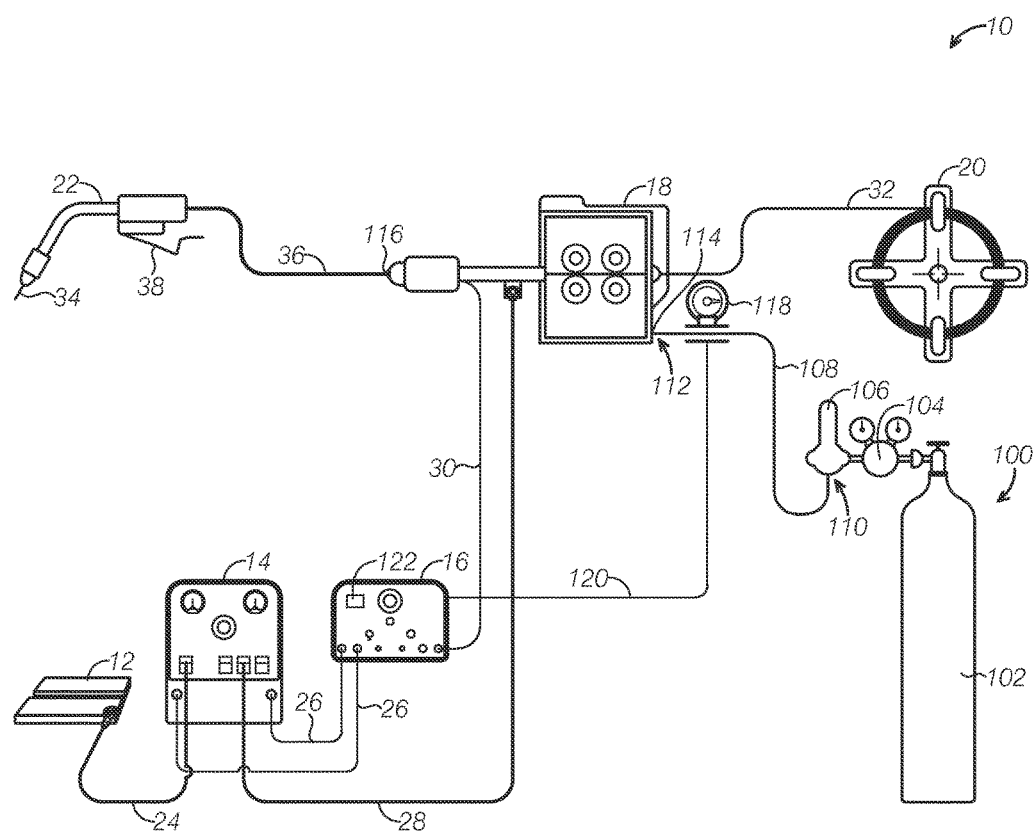
FIG. 1 is a schematic view of a first example of an arc welding system including a first example shielding gas mechanism.
Figure 2:
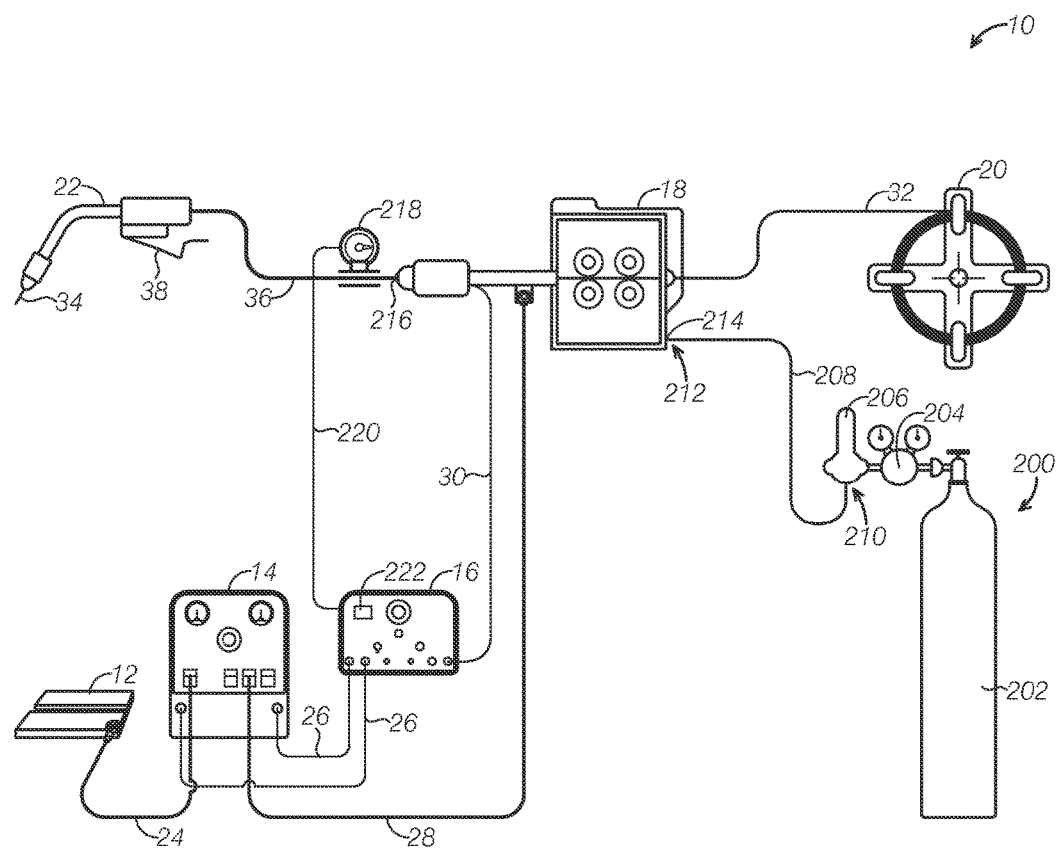
FIG. 2 is a schematic view of the first example of an arc welding system including a second example shielding gas mechanism.
Figure 3:
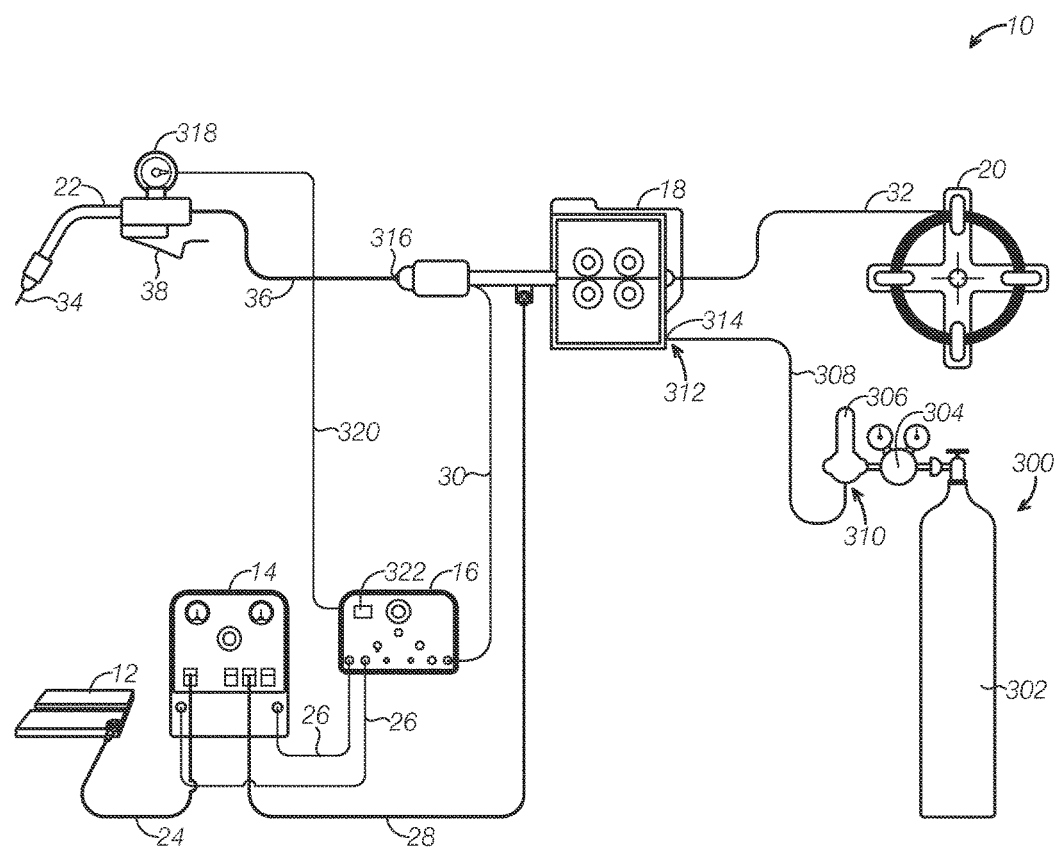
FIG. 3 is a schematic view of the first example of an arc welding system including a third example shielding gas mechanism.

With reference to FIGS. 1-3, a first example of an arc welding system, arc welding system 10, will now be described. Arc welding system 10 includes a shielding gas mechanism (e.g., shielding gas mechanisms 100, 200, or 300). The presently described shielding gas mechanisms function to monitor the shielding gas during a welding operation and stop power if a measurement of the shielding gas falls below a minimum effective level. Additionally or alternatively, the presently described shielding gas mechanisms can alert a user that the measurement of the shielding gas is below the minimum effective level. The reader will appreciate from the figures and description below that the presently described example gas shielding mechanisms addresses shortcomings of conventional gas shielding mechanism.

For example, shielding gas mechanisms 100, 200, and 300 can effectively halt the welding operation and/or alert the user if the shielding gas falls below the minimum effective level. Accordingly, the presently described systems can limit welding in conditions where the shielding gas level is insufficient to prevent air contamination and/or porous or weak welds.

As shown in FIGS. 1-3, arc welding system 10 includes a grounding surface 12, a power supply 14, a controller 16, an electrode feeder 18, an electrode source 20 (i.e., an electrode reel), and a welding gun 22 (i.e., a welding torch). A grounding cable 24 electrically couples power supply 14 to grounding surface 12. Further, wires 26 electrically couple power supply 14 to controller 16. In some examples, wires 26 additionally enable data communication between the power source and the controller. Power source 14 and controller 16 are coupled to electrode feeder 18 via wires 28 and 30, respectively. An electrode wire 32 is unwound from electrode reel 20 via feeder 18 and directed to a tip 34 of welding gun 22 through a welding gun line 36. Welding gun 22 can be operated by a user via trigger 38.

In other examples, the power supply and the controller can be combined in a single unit. Further, in other examples, the arc welding system can include additional or alternative features. Furthermore, it will be appreciated that arc welding system 10 is just one example configuration for an arc welding system and the various components can have an alternate arrangement, configuration, and/or mode of coupling.

As depicted in FIG. 1, arc welding system 10 may additionally include a shielding gas mechanism 100. Shielding gas mechanism 100 includes a gas supply tank 102, a tank gauge 104, a flowmeter outlet 106, and a gas hose 108 (i.e., a gas line). Gas hose 108 (i.e., an upstream portion of the gas line) is fluidly coupled at a first end 110 gas tank outlet 106. An opposing second end 112 of gas hose 108 is fluidly coupled to a gas inlet 114 of electrode feeder 18. A gas outlet 116 of feeder 18 is coupled to line 36 (i.e., a downstream portion of the gas line) for delivering shielding gas to welding gun 22.

Shielding gas mechanism 100 further includes a sensor 118 fluidly coupled to gas hose 108 proximal to gas inlet 114. Sensor 118 is electrically coupled to controller 16 via wire 120. It will be appreciated that although wire 120 is shown as a separate wire in FIG. 1, in some examples, the wire can be incorporated into the feeder and coupled to the controller via wire 30. Sensor 118 is configured to read and provide a measurement of the shielding gas to controller 16.

Controller 16 includes a shut-off mechanism 122. Shut-off mechanism 122 is configured to receive the measurement of the shielding gas and determine if the shielding gas is below a minimum effective level. In some examples, sensor 118 is a pressure sensor. Therefore, the measurement of the shielding gas is a measurement of gas pressure and the minimum effective level is a minimum effective gas pressure (e.g., ¼ lb gas pressure). In other examples, sensor 118 is a flowmeter sensor. Therefore, the measurement of the shielding gas is a measurement of gas flow rate and the minimum effective level is a minimum effective gas flow rate (e.g., 10 cubic ft/min).

In response to the measurement of the shielding gas falling below the minimum effective level, the shut-off mechanism is further configured to stop power (i.e., the flow of electricity) to welding gun 22. In some examples, the shut-off mechanism is coupled to the power supply and is configured to regulate power to the welding system. In other words, the shut-off mechanism is configured to stop power to the entire welding system when the shielding gas falls below the minimum effective level. In other examples, the shut-off mechanism is coupled to the welding gun and is configured to regulate power to the welding gun. In other words, the shut-off mechanism is configured to stop power to the welding gun, while the remainder of the welding system remains powered.

Alternatively or additionally, the shut-off mechanism can provide an alert (e.g., an audible signal, a visual signal, etc.) to the user that the measurement of the shielding gas level has decreased below the minimum effective level. The alert can coincide with the shut-off mechanism stopping power to the welding gun in order to notify the user that the welding gun has stopped because the shot-off mechanism has been activated, rather than there being a functional issue with the welding gun. In other words, the shut-off mechanism further includes an alert mechanism configured to alert (via a visual signal and/or an aural signal) the user that the shut-off mechanism is activated.

Turning now to FIG. 2, arc welding system 10 may alternatively include a shielding gas mechanism 200. Shielding gas mechanism 200 includes a gas supply tank 202, a tank gauge 204, a flowmeter outlet 206, and a gas hose 208 (i.e., a gas line). Gas hose 208 (i.e., an upstream portion of the gas line) is fluidly coupled at a first end 210 gas tank outlet 206. An opposing second end 212 of gas hose 208 is fluidly coupled to a gas inlet 214 of electrode feeder 18. A gas outlet 216 of feeder 18 is coupled to line 36 (i.e., a downstream portion of the gas line) for delivering shielding gas to welding gun 22.

Shielding gas mechanism 200 further includes a sensor 218 fluidly coupled to line 36 proximal to gas outlet 216. Sensor 218 is electrically coupled to controller 16 via wire 220. It will be appreciated that although wire 220 is shown as a separate wire in FIG. 1, in some examples, the wire can be incorporated into the feeder and coupled to the controller via wire 30. Sensor 218 is configured to read and provide a measurement of the shielding gas to controller 16.

Controller 16 includes a shut-off mechanism 222. Shut-off mechanism 222 is configured to receive the measurement of the shielding gas and determine if the shielding gas is below a minimum effective level. In some examples, sensor 218 is a pressure sensor. Therefore, the measurement of the shielding gas is a measurement of gas pressure and the minimum effective level is a minimum effective gas pressure (e.g., ¼ lb gas pressure). In other examples, sensor 218 is a flowmeter sensor. Therefore, the measurement of the shielding gas is a measurement of gas flow rate and the minimum effective level is a minimum effective gas flow rate (e.g., 10 cubic ft/min).

In response to the measurement of the shielding gas falling below the minimum effective level, the shut-off mechanism is further configured to stop power (i.e., the flow of electricity) to welding gun 22. In some examples, the shut-off mechanism is coupled to the power supply and is configured to regulate power to the welding system. In other words, the shut-off mechanism is configured to stop power to the entire welding system when the shielding gas falls below the minimum effective level. In other examples, the shut-off mechanism is coupled to the welding gun and is configured to regulate power to the welding gun. In other words, the shut-off mechanism is configured to stop power to the welding gun, while the remainder of the welding system remains powered.

Alternatively or additionally, the shut-off mechanism can provide an alert (e.g., an audible signal, a visual signal, etc.) to the user that the measurement of the shielding gas level has decreased below the minimum effective level. The alert can coincide with the shut-off mechanism stopping power to the welding gun in order to notify the user that the welding gun has stopped because the shot-off mechanism has been activated, rather than there being a functional issue with the welding gun. In other words, the shut-off mechanism further includes an alert mechanism configured to alert (via a visual signal and/or an aural signal) the user that the shut-off mechanism is activated.

Turning now to FIG. 3, arc welding system 10 may alternatively include a shielding gas mechanism 300. Shielding gas mechanism 300 includes a gas supply tank 302, a tank gauge 304, a flowmeter outlet 306, and a gas hose 308 (i.e., a gas line). Gas hose 308 (i.e., an upstream portion of the gas line) is fluidly coupled at a first end 310 gas tank outlet 306. An opposing second end 312 of gas hose 308 is fluidly coupled to a gas inlet 314 of electrode feeder 18. A gas outlet 316 of feeder 18 is coupled to line 36 (i.e., a downstream portion of the gas line) for delivering shielding gas to welding gun 22.

Shielding gas mechanism 300 further includes a sensor 318 fluidly coupled to welding gun 22. Sensor 318 is electrically coupled to controller 16 via wire 320. It will be appreciated that although wire 320 is shown as a separate wire in FIG. 1, in some examples, the wire can be incorporated into the feeder and coupled to the controller via wire 30. Sensor 318 is configured to read and provide a measurement of the shielding gas to controller 16.

Controller 16 includes a shut-off mechanism 322. Shut-off mechanism 322 is configured to receive the measurement of the shielding gas and determine if the shielding gas is below a minimum effective level. In some examples, sensor 318 is a pressure sensor. Therefore, the measurement of the shielding gas is a measurement of gas pressure and the minimum effective level is a minimum effective gas pressure (e.g., lb gas pressure). In other examples, sensor 318 is a flowmeter sensor. Therefore, the measurement of the shielding gas is a measurement of gas flow rate and the minimum effective level is a minimum effective gas flow rate (e.g., 10 cubic ft/min).

In response to the measurement of the shielding gas falling below the minimum effective level, the shut-off mechanism is further configured to stop power (i.e., the flow of electricity) to welding gun 22. In some examples, the shut-off mechanism is coupled to the power supply and is configured to regulate power to the welding system. In other words, the shut-off mechanism is configured to stop power to the entire welding system when the shielding gas falls below the minimum effective level. In other examples, the shut-off mechanism is coupled to the welding gun and is configured to regulate power to the welding gun. In other words, the shut-off mechanism is configured to stop power to the welding gun, while the remainder of the welding system remains powered.

Alternatively or additionally, the shut-off mechanism can provide an alert (e.g., an audible signal, a visual signal, etc.) to the user that the measurement of the shielding gas level has decreased below the minimum effective level. The alert can coincide with the shut-off mechanism stopping power to the welding gun in order to notify the user that the welding gun has stopped because the shot-off mechanism has been activated, rather than there being a functional issue with the welding gun. In other words, the shut-off mechanism further includes an alert mechanism configured to alert (via a visual signal and/or an aural signal) the user that the shut-off mechanism is activated.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A gas metal arc welding system, comprising:
a welding gun;
a wire feed unit coupled to the welding gun;
an electrode source coupled to the wire feed unit to provide a wire electrode to the welding gun;
an electrical power supply configured to provide electrical power to the welding gun;
a shielding gas supply configured to provide a shielding gas to the welding gun via a gas line;
a gas sensor configured to read and provide a measurement of the shielding gas; and
a shut-off mechanism configured to allow welding operations to continue if the measurement of the shielding gas indicates a leak, and configured to stop electrical power to the welding gun only when the measurement of the shielding gas falls below a minimum effective level.

2. The welding system of claim 1, wherein the gas sensor is coupled to the gas line proximal to the welding gun.

3. The welding system of claim 1, wherein an upstream portion of the gas line is coupled to an inlet of the feed unit and a downstream portion of the gas line is coupled to the welding gun.

4. The welding system of claim 3, wherein the gas sensor is coupled to the upstream portion of the gas line proximal to the inlet of the feed unit.

5. The welding system of claim 3, wherein the gas sensor is coupled to the downstream portion of the gas line proximal to the outlet of the feed unit.

6. The welding system of claim 1, wherein the shut-off mechanism further includes an alert mechanism configured to alert the user that the shut-off mechanism is activated.

7. The welding system of claim 6, wherein the alert mechanism comprises one or more of a visual signal and an aural signal.

8. The welding system of claim 1, wherein the shut-off mechanism is coupled to the welding gun and is configured to regulate power to the welding gun.

9. The welding system of claim 1, wherein the shut-off mechanism is coupled to the power supply and is configured to regulate power to the welding system.

10. The welding system of claim 1, wherein the gas sensor is a pressure sensor and the measurement of the shielding gas is a measurement of gas pressure, the minimum effective level being a minimum effective gas pressure, where the minimum effective level is ¼ pounds of gas pressure.

11. The welding system of claim 1, wherein the gas sensor is a flowmeter and the measurement of gas flow is a rate of gas flow, the minimum effective level being a minimum effective gas flow rate, where the minimum effective flow rate is 10 cubic feet per minute.

12. A shielding gas mechanism for an arc welding system, the gas metal arc welding system having a welding gun, a wire feed unit coupled to the welding gun, an electrode source coupled to the wire feed unit to provide a wire electrode to the welding gun, an electrical power supply configured to provide electrical power to the welding gun, and a shielding gas supply configured to provide gas flow to the welding gun via a gas line, and a control system, the control system comprising:
a gas sensor configured to read and provide a measurement of the shielding gas;
a shut-off mechanism configured to allow welding operations to continue if the measurement of the shielding gas indicates a leak, and configured to stop electrical power to the welding gun only when the measurement of the shielding gas falls below a predetermined minimum effective level; and an alert mechanism configured to alert the user that the shut-off mechanism is activated wherein the alert mechanism comprises one or more of a visual signal and an aural signal.

13. The shielding gas mechanism of claim 12, wherein the gas sensor is coupled to the gas line proximal to the welding gun.

14. The shielding gas mechanism of claim 12, wherein an upstream portion of the gas line is coupled to an inlet of the feed unit and a downstream portion of the gas line is coupled to an outlet of the feed unit, and the gas sensor is coupled to the upstream portion of the gas line proximal to the inlet of the feed unit.

15. The shielding gas mechanism of claim 12, wherein an upstream portion of the gas line is coupled to an inlet of the feed unit and a downstream portion of the gas line is coupled to an outlet of the feed unit, and the gas sensor is coupled to the downstream portion of the gas line proximal to the outlet of the feed unit.

16. The shielding gas mechanism of claim 10, wherein the shut-off mechanism is coupled to one or more of the welding gun and the power supply, and is configured to regulate power to the welding gun.

17. A gas metal arc welding system, comprising:
a welding gun;
a wire feed unit coupled to the welding gun;
an electrode source coupled to the wire feed unit to provide a wire electrode to the welding gun;
an electrical power supply configured to provide electrical power to the welding gun;
a shielding gas supply configured to provide a shielding gas to the welding gun via a gas line;
a gas sensor configured to provide a measurement of the shielding gas; and
a shut-off mechanism coupled to one or more of the welding gun and the power supply and configured to allow welding operations to continue if the measurement of the shielding gas indicates a leak, and configured to stop electrical power to the welding gun only when the measurement of the shielding gas falls below a minimum effective level, wherein the shut-off mechanism is ala configured to provide one or more of a visual or aural signal to the user when the measurement of the shielding gas falls below the minimum effective level.

18. The gas metal arc welding system of claim 17, wherein the gas sensor is coupled to the gas line proximal to the welding gun.

19. The gas metal arc welding system of claim 17, wherein an upstream portion of the gas line is coupled to an inlet of the feed unit and a downstream portion of the gas line is coupled to the welding gun, and the gas sensor is coupled to the upstream portion of the gas line proximal to the inlet of the feed unit.

20. The gas metal arc welding system of claim 17, wherein an upstream portion of the gas line is coupled to an inlet of the feed unit and a downstream portion of the gas line is coupled to the welding gun, and the gas sensor is coupled to the downstream portion of the gas line proximal to the outlet of the feed unit.

* * * * *